United States Patent
Sasama et al.

(10) Patent No.: US 12,012,507 B2
(45) Date of Patent: Jun. 18, 2024

(54) THERMOPLASTIC ELASTOMER COMPOSITION AND AUTOMOBILE WEATHER STRIP

(71) Applicant: ENEOS Materials Corporation, Tokyo (JP)

(72) Inventors: Shouhei Sasama, Minato-ku (JP); Yuki Sato, Minato-ku (JP); Osamu Kose, Minato-ku (JP)

(73) Assignee: ENEOS Materials Corporation, Tokyo (JP)

( * ) Notice: Subject to any disclaimer, the term of this patent is extended or adjusted under 35 U.S.C. 154(b) by 0 days.

(21) Appl. No.: 17/821,547

(22) Filed: Aug. 23, 2022

(65) Prior Publication Data

US 2023/0070658 A1    Mar. 9, 2023

(30) Foreign Application Priority Data

Aug. 26, 2021 (JP) .................... 2021-137842

(51) Int. Cl.
*C08L 23/16* (2006.01)

(52) U.S. Cl.
CPC .......... *C08L 23/16* (2013.01); *C08L 2205/025* (2013.01); *C08L 2205/03* (2013.01); *C08L 2207/04* (2013.01); *C08L 2207/322* (2013.01); *C08L 2312/00* (2013.01)

(58) Field of Classification Search
CPC ............... C08L 23/16; C08L 2205/025; C08L 2205/03; C08L 2207/04; C08L 2207/322; C08L 2312/00; C08L 2205/22; C08L 53/00; C08L 23/0815; C08L 23/12; C08L 23/14; C08L 91/00; C08K 5/14
See application file for complete search history.

(56) References Cited

U.S. PATENT DOCUMENTS

| 5,298,211 A | 3/1994 | Hamanaka et al. |
| 2004/0242779 A1 | 12/2004 | Cai et al. |

FOREIGN PATENT DOCUMENTS

| EP | 2 322 566 A1 | 5/2011 |
| JP | 2014-193969 A | 10/2014 |
| WO | WO 2014/003857 A1 | 1/2014 |
| WO | WO 2014/003857 A9 | 1/2014 |

OTHER PUBLICATIONS

Extended European Search Report issued Jan. 9, 2023, in European Patent Application 22191881.6, 6 pages.
U.S. Appl. No. 17/865,562, filed Jul. 15, 2022, Kobayashi, et al.

*Primary Examiner* — Ling Siu Choi
*Assistant Examiner* — Olga Lucia Donahue
(74) *Attorney, Agent, or Firm* — Oblon, McClelland, Maier & Neustadt, L.L.P.

(57) ABSTRACT

Provided is a thermoplastic elastomer composition obtained by melt-kneading an ethylene/α-olefin/non-conjugated polyene copolymer rubber (A) that is a copolymer of ethylene, an α-olefin having 3 to 20 carbon atoms, and a non-conjugated polyene, a polyolefin resin (B), and a mineral oil-based softening agent (C) in the presence of an organic peroxide (D) and a crosslinking aid (E), the thermoplastic elastomer composition having a shear viscosity of from 5 Pa·s to 20 Pa·s at 140° C. and 10,000 $s^{-1}$.

5 Claims, No Drawings

THERMOPLASTIC ELASTOMER COMPOSITION AND AUTOMOBILE WEATHER STRIP

CROSS-REFERENCE TO RELATED APPLICATION

Japanese Patent Application No. 2021-137842, filed on Aug. 26, 2021, is hereby incorporated by reference in its entirety.

BACKGROUND OF THE INVENTION

The present invention relates to a thermoplastic elastomer composition and an automobile weather strip.

There is known an olefin-based thermoplastic elastomer obtained by dynamically subjecting a composition formed of an ethylene-based copolymer and a polyolefin resin to heat treatment in the presence of an organic peroxide (see, for example, JP 2014-193969A). Molding processing using such olefin-based thermoplastic elastomer as a material does not require a vulcanization process in its production, and has advantages in that a molding method for a general thermoplastic resin, such as injection molding, profile extrusion molding, calendering, or blow molding, can be adopted, and that the molding processing can be applied to a complicated shape.

Meanwhile, such olefin-based thermoplastic elastomer needs to be molded while being caused to flow into a mold having a specific shape by being heated into a molten state, and hence, when a preset temperature or a flow characteristic of the thermoplastic elastomer material is insufficient, molding into a preferred shape cannot be performed, or a defect in quality or design, such as a flow mark or delamination, occurs on a surface of a molded article in some cases.

In order to solve such problem, a formulation in which a plasticizer is added to a thermoplastic elastomer has been considered, but has had a risk in that a plasticizer component may bleed out of the molded article to cause a reduction in, for example, restorability or material strength.

SUMMARY

Some aspects according to the invention provide a thermoplastic elastomer composition that is excellent in fluidity in a wide temperature region, and that provides a satisfactory appearance of a molded article.

According to a first aspect of the invention, there is provided a thermoplastic elastomer composition obtained by melt-kneading an ethylene/α-olefin/non-conjugated polyene copolymer rubber (A) that is a copolymer of ethylene, an α-olefin having 3 to 20 carbon atoms, and a non-conjugated polyene, a polyolefin resin (B), and a mineral oil-based softening agent (C) in the presence of an organic peroxide (D) and a crosslinking aid (E), the thermoplastic elastomer composition having a shear viscosity of from 5 Pa·s to 20 Pa·s at 140° C. and 10,000 $s^{-1}$.

According to a second aspect of the invention, there is provided an automobile weather strip, in at least part of which the thermoplastic elastomer composition is used.

DETAILED DESCRIPTION OF THE EMBODIMENT

The invention has been made to solve at least some of the above-mentioned problems, and can be achieved as the following embodiments.

According to an embodiment of the invention, there is provided a thermoplastic elastomer composition obtained by melt-kneading an ethylene/α-olefin/non-conjugated polyene copolymer rubber (A) that is a copolymer of ethylene, an α-olefin having 3 to 20 carbon atoms, and a non-conjugated polyene, a polyolefin resin (B), and a mineral oil-based softening agent (C) in the presence of an organic peroxide (D) and a crosslinking aid (E), the thermoplastic elastomer composition having a shear viscosity of from 5 Pa·s to 20 Pa·s at 140° C. and 10,000 $s^{-1}$.

In the thermoplastic elastomer composition, when the thermoplastic elastomer composition is subjected to differential scanning calorimetry by decreasing a temperature from 200° C. to −80° C. at −10° C./min in conformity with ISO 11357-3:2018, an exothermic peak temperature may be observed from 70° C. to 85° C.

In the thermoplastic elastomer composition, when a total exothermic energy amount of a peak observed when the polyolefin resin (B) is subjected to differential scanning calorimetry by decreasing a temperature from 200° C. to −80° C. at −10° C./min in conformity with ISO 11357-3:2018 is defined as 100%, a temperature at which the observed peak reaches 95% by being integrated from a high-temperature side may be from 75° C. to 95° C.

In the thermoplastic elastomer composition, a mass ratio (C)/(A) between the mineral oil-based softening agent (C) and the ethylene/α-olefin/non-conjugated polyene copolymer rubber (A) may fall within a range of from 0.8 to 1.9.

The thermoplastic elastomer composition may have an endothermic energy amount of from 1 $J·g^{-1}$ to 25 $J·g^{-1}$ for a peak observed when differential scanning calorimetry is performed by increasing a temperature from −80° C. to 200° C. at 10° C./min in conformity with ISO 11357-3:2018.

The thermoplastic elastomer composition may further include an amorphous polyolefin resin (F) having an endothermic energy amount of 10.5 $J·g^{-1}$ or less for a peak observed when differential scanning calorimetry is performed by increasing a temperature from −80° C. to 200° C. at 10° C./min in conformity with ISO 11357-3:2018.

According to an embodiment of the invention, there is provided an automobile weather strip, in at least part of which the thermoplastic elastomer composition is used.

The thermoplastic elastomer composition is excellent in fluidity in a wide temperature region, and hence can be easily molded into a preferred shape and provide a molded article having a satisfactory appearance.

Preferred embodiments according to the invention are described in detail below. It should be understood that the invention is not limited to the embodiments described below, and encompasses various modifications that are implemented without departing from the scope of the invention.

Herein, a numerical range described with "from X to Y" is construed as including a numerical value X as a lower limit value and including a numerical value Y as an upper limit value.

As used herein, the term "ethylene/α-olefin/non-conjugated polyene copolymer rubber (A)" is sometimes abbreviated as "component (A)", the term "polyolefin resin (B)" is sometimes abbreviated as "component (B)", the term "mineral oil-based softening agent (C)" is sometimes abbreviated as "component (C)", the term "organic peroxide (D)" is sometimes abbreviated as "component (D)", the term "crosslinking aid (E)" is sometimes abbreviated as "component (E)", the term "amorphous polyolefin resin (F)" is sometimes abbreviated as "component (F)", and the term "differential scanning calorimetry" is sometimes abbreviated as "DSC measurement".

1. THERMOPLASTIC ELASTOMER COMPOSITION

A thermoplastic elastomer composition according to an embodiment of the invention is a composition obtained by melt-kneading an ethylene/α-olefin/non-conjugated polyene copolymer rubber (A), which is a copolymer of ethylene, an α-olefin having 3 to 20 carbon atoms, and a non-conjugated polyene, a polyolefin resin (B), and a mineral oil-based softening agent (C) in the presence of an organic peroxide (D) and a crosslinking aid (E). The thermoplastic elastomer composition according to this embodiment forms a sea-island structure with the component (A) serving as a dispersed phase and the component (B) serving as a continuous phase.

In the thermoplastic elastomer composition according to this embodiment, the blending ratio of the mineral oil-based softening agent (C) is such a ratio that a mass ratio (C)/(A) between the mineral oil-based softening agent (C) and the ethylene/α-olefin/non-conjugated polyene copolymer rubber (A) falls within preferably the range of from 0.8 to 1.9, more preferably the range of from 0.9 to 1.8, particularly preferably the range of from 1.0 to 1.7. When the blending ratio of the mineral oil-based softening agent (C) falls within the above-mentioned ranges, appropriate fluidity is imparted to the thermoplastic elastomer composition, and besides, the occurrence of oil bleeding can be reduced.

The thermoplastic elastomer composition obtained as described above has a shear viscosity at 140° C. and 10,000 $s^{-1}$ of from 5 Pa·s to 20 Pa·s, preferably from 5.5 Pa·s to 19.5 Pa·s, more preferably from 6 Pa·s to 19 Pa·s, still more preferably from 6.5 Pa·s to 18.5 Pa·s, particularly preferably from 7 Pa·s to 18 Pa·s.

In addition, in DSC measurement involving subjecting the thermoplastic elastomer composition to measurement by decreasing a temperature from 200° C. to −80° C. at −10° C./min in conformity with ISO 11357-3:2018, a temperature at which an exothermic peak is observed is preferably from 70° C. to 85° C., more preferably from 70° C. to 84° C., particularly preferably from 70° C. to 83° C.

Further, an endothermic energy amount for a peak observed in DSC measurement involving subjecting the thermoplastic elastomer composition to measurement by increasing a temperature from −80° C. to 200° C. at 10° C./min in conformity with ISO 11357-3:2018 is preferably from 1 $J·g^{-1}$ to 25 $J·g^{-1}$, more preferably from 2 $J·g^{-1}$ to 24 $J·g^{-1}$, particularly preferably from 3 $J·g^{-1}$ to 23 $J·g^{-1}$.

When the shear viscosity of the thermoplastic elastomer composition according to this embodiment, and its exothermic peak temperature and endothermic energy amount in DSC measurement fall within the above-mentioned ranges, the thermoplastic elastomer composition shows fluidity even in a relatively low temperature region with respect to a general molding temperature, and can be subjected to molding processing without causing a significant defect in molding appearance.

Each component contained in the thermoplastic elastomer composition according to this embodiment is described below.

1.1. Ethylene/α-Olefin/Non-Conjugated Polyene Copolymer Rubber (A)

Examples of the ethylene/α-olefin/non-conjugated polyene copolymer rubber (A) to be used in this embodiment include random copolymers each using ethylene and an α-olefin having 3 to 10 carbon atoms as main components, such as an ethylene/propylene/non-conjugated diene terpolymer rubber and an ethylene/1-butene/non-conjugated diene terpolymer rubber.

Examples of the α-olefin having 3 to 10 carbon atoms may include propylene, 1-butene, 1-pentene, 3-methyl-1-butene, 1-hexene, 3-methyl-1-pentene, 4-methyl-1-pentene, 3-ethyl-1-pentene, 1-heptene, 1-octene, and 1-decene. Those α-olefins may be used alone or as a mixture thereof. Of those, propylene and 1-butene are particularly preferred.

Examples of the non-conjugated diene may include 1,4-pentadiene, 1,4-hexadiene, 1,5-hexadiene, 1,7-octadiene, 1,9-decadiene, 3,6-dimethyl-1,7-octadiene, 4,5-dimethyl-1,7-octadiene, 5-methyl-1,8-nonadiene, dicyclopentadiene, 5-ethylidene-2-norbornene, 5-vinyl-2-norbornene, and 2,5-norbornadiene. Those dienes may be used alone or as a mixture thereof. Of those, 1,4-hexadiene, dicyclopentadiene, and 5-ethylidene-2-norbornene are particularly preferred.

Specific examples of the component (A) include an ethylene/propylene/dicyclopentadiene terpolymer, an ethylene/propylene/5-ethylidene-2-norbornene terpolymer, and an ethylene/1-butene/5-ethylidene-2-norbornene terpolymer.

The content of ethylene in any such terpolymer is preferably from 50 mass % to 90 mass %, more preferably from 55 mass % to 85 mass % with respect to 100 mass % in total of the ethylene unit, the α-olefin unit, and the non-conjugated polyene unit. In addition, the content of the α-olefin is preferably from 5 mass % to 40 mass %, more preferably from 10 mass % to 35 mass % with respect to 100 mass % in total of the ethylene unit, the α-olefin unit, and the non-conjugated polyene unit. When the content of ethylene in the terpolymer falls within the above-mentioned ranges, crosslinking efficiency tends to be improved, and hence a compression set characteristic can be reduced to a low level in some cases.

In addition, the content of the non-conjugated polyene is preferably from 3 mass % to 10 mass %, more preferably from 3 mass % to 8 mass % with respect to 100 mass % in total of the ethylene unit, the α-olefin unit, and the non-conjugated polyene unit.

The limiting viscosity [η] of the ethylene/α-olefin/non-conjugated polyene copolymer rubber (A) when measured in a decalin solvent at 135° C. is preferably from 1 dl/g to 10 dl/g, more preferably from 2 dl/g to 10 dl/g, particularly preferably from 3 dl/g to 9 dl/g.

In addition, the polydispersity ratio (Mw/Mn) of the ethylene/α-olefin/non-conjugated polyene copolymer rubber (A) is preferably 5.0 or less, more preferably 4.5 or less, particularly preferably 4.0 or less. Herein, Mw represents a weight average molecular weight, Mn represents a number average molecular weight, and Mw and Mn are values in terms of polystyrene measured by gel permeation chromatography (GPC).

In the production process, the component (A) may be blended as an oil-extended rubber having the mineral oil-based softening agent (C) to be described later added thereto. When the component (A) is blended as an oil-extended rubber, molding processability tends to be improved.

The content ratio of the component (A) in the thermoplastic elastomer composition according to this embodiment is preferably from 17 mass % to 50 mass %, more preferably from 20 mass % to 47 mass %, particularly preferably from 22 mass % to 44 mass % with respect to 100 mass % of the total amount of the component (A), the component (B), and the component (C).

1.2. Polyolefin Resin (B)

In the polyolefin resin (B) to be used in this embodiment, when a total exothermic energy amount of a peak observed when DSC measurement is performed by decreasing a temperature from 200° C. to −80° C. at −10° C./min in conformity with ISO 11357-3:2018 is defined as 100%, a temperature at which the observed peak reaches 95% by being integrated from a high-temperature side is preferably from 75° C. to 95° C. When the exothermic peak is observed even at low temperature, a thermoplastic elastomer composition having fluidity without solidifying even at low temperature can be easily obtained. Such thermoplastic elastomer composition can have characteristics, such as (1) having a wider process window for molding processing than a related-art composition, (2) being less liable to cause a defect such as a molding appearance failure, and (3) being able to be processed even at a relatively low temperature, and hence can be expected to improve productivity.

Examples of the polyolefin resin (B) include polypropylene, a propylene/ethylene copolymer, a propylene/1-butene copolymer, a propylene/1-pentene copolymer, a propylene/3-methyl-1-butene copolymer, a propylene/1-hexene copolymer, a propylene/3-methyl-1-pentene copolymer, a propylene/4-methyl-1-pentene copolymer, a propylene/3-ethyl-1-pentene copolymer, a propylene/1-octene copolymer, a propylene/1-decene copolymer, and a propylene/1-undecene copolymer. Of those, polypropylene and a propylene/ethylene copolymer are preferably used. Those resins may be used alone or in combination thereof.

The content ratio of the polyolefin resin (B) in the thermoplastic elastomer composition according to this embodiment is preferably from 8 mass % to 50 mass %, more preferably from 10 mass % to 40 mass %, particularly preferably from 12 mass % to mass % with respect to 100 mass % of the total amount of the component (A), the component (B), and the component (C).

1.3. Mineral Oil-Based Softening Agent (C)

The mineral oil-based softening agent (C) to be used in this embodiment preferably has a molecular weight of from 300 to 2,000, particularly from 500 to 1,500 in terms of weight average molecular weight. A rubber softening agent formed of a mineral oil-based hydrocarbon is generally a three-component mixture of an aromatic ring, a naphthene ring, and a paraffin chain, and is classified as follows: one in which the number of carbon atoms of the paraffin chain accounts for 50% or more in the total number of carbon atoms is classified as a paraffin-based oil, one in which the number of carbon atoms of the naphthene ring accounts for from 30% to 45% in the total number of carbon atoms is classified as a naphthene-based oil, and one in which the number of carbon atoms of the aromatic ring accounts for 30% or more in the total number of carbon atoms is classified as an aromatic oil. In the invention, a paraffin-based one is preferred, and a hydrogenated paraffin-based one is particularly preferred. In addition, the mineral oil-based hydrocarbon preferably has a kinematic viscosity at 40° C. of from $2\times10^{-5}$ m$^2$/s to $8\times10^{-4}$ m$^2$/s (from 20 cSt to 800 cSt), particularly from $5\times10^{-5}$ m$^2$/s to $6\times10^{-4}$ m$^2$/s (from 50 cSt to 600 cSt), and a pour point of from −40° C. to 0° C., particularly from −30° C. to 0° C.

When the component (A) to be used in this embodiment is an oil-extended rubber, it is preferred that an extender oil contained in the oil-extended rubber also serve as the mineral oil-based softening agent.

1.4. Organic Peroxide (D)

Examples of the organic peroxide (D) to be used in this embodiment may include 1,3-di(tert-butylperoxyisopropyl)benzene, 2,5-dimethyl-2,5-di(tert-butylperoxy)hexyne-3, 2,5-dimethyl-2,5-di(tert-butylperoxy)hexene-3, 1,3-bis(tert-butylperoxyisopropyl)benzene, 2,5-dimethyl-2,5-di(tert-butylperoxy)hexane, 2,2-di(tert-butylperoxy)-p-isopropylbenzene, dicumyl peroxide, di-tert-butyl peroxide, tert-butyl peroxide, tert-butyl cumyl peroxide, di-tert-butyl peroxide, p-menthane peroxide, 1,1-bis(tert-butylperoxy)-3,3,5-trimethylcyclohexane, dilauroyl peroxide, diacetyl peroxide, tert-butyl peroxybenzoate, 2,4-dichlorobenzoyl peroxide, p-chlorobenzoyl peroxide, benzoyl peroxide, di(tert-butylperoxy)perbenzoate, n-butyl-4,4-bis(tert-butylperoxy) valerate, and tert-butylperoxyisopropyl carbonate. Of those organic peroxides, dialkyl peroxides, such as 1,3-bis(tert-butylperoxyisopropyl)benzene, 2,5-dimethyl-2,5-di(tert-butylperoxy)hexyne-3, and 2,5-dimethyl-2,5-di(tert-butylperoxy)hexane, are preferred.

The blending ratio of the organic peroxide (D) is preferably from 0.01 part by mass to 2.0 parts by mass, more preferably from 0.02 part by mass to 1.5 parts by mass with respect to 100 parts by mass in total of the component (A), the component (B), and the component (C) from the viewpoint of performing partial crosslinking that is uniform and mild.

1.5. Crosslinking Aid (E)

The crosslinking aid (E) to be used in this embodiment is preferably a polyfunctional compound. In the invention, the "polyfunctional compound" refers to a low-molecular-weight compound having two or more non-conjugated carbon-carbon double bonds per molecule, the compound being capable of allowing a crosslinking reaction to efficiently proceed through combined use with another crosslinking agent free of such double bonds, to thereby express a uniform crosslinking structure and excellent rubber elasticity.

Examples of the polyfunctional compound include ethylene glycol di(meth)acrylate, diethylene glycol di(meth)acrylate, triethylene glycol di(meth)acrylate, tetraethylene glycol di(meth)acrylate, polyethylene glycol di(meth)acrylate, trimethylolpropane tri(meth)acrylate, diallyl phthalate, diallyl terephthalate, tetraallyloxyethane, triallyl cyanurate, N,N'-m-phenylene bismaleimide, N,N'-toluylene bismaleimide, bis(3-ethyl-5-methyl-4-maleimidophenyl)methane, divinylbenzene, and zinc di(meth)acrylate. Those polyfunctional compounds may be used alone or in combination thereof.

When the polyfunctional compound having high reactivity to a free radical to be generated during the melt-kneading is used in combination, the crosslinking reaction can quickly proceed to form a rubber domain having a high crosslink density, and besides, side reactions other than the crosslinking reaction of the free radical (e.g., a disproportionation reaction between free radical species, a hydrogen abstraction reaction that is not involved in the crosslinking reaction, and a β-elimination reaction involving the cleavage of the main chain of the copolymer rubber or the polyolefin resin) can be reduced.

The blending ratio of the crosslinking aid (E) is preferably 3 parts by mass or less, more preferably from 0.1 part by mass to 1.5 parts by mass, particularly preferably from 0.2 part by mass to 1.2 parts by mass with respect to 100 parts by mass in total of the component (A), the component (B), and the component (C) from the viewpoint of maintaining the uniformity of the phase structure and the molding processability.

1.6. Amorphous Polyolefin Resin (F)

The amorphous polyolefin resin (F) to be optionally used in this embodiment preferably has an endothermic energy amount of 10.5 J·g$^{-1}$ or less for a peak observed when DSC measurement is performed by increasing a temperature from −80° C. to 200° C. at 10° C./min in conformity with ISO 11357-3:2018. When such amorphous polyolefin resin is incorporated, the composition is reduced in hardness, and besides, while its fluidity at low temperature is maintained, a molded article having a satisfactory appearance is obtained.

Examples of the amorphous polyolefin resin may include: homopolymers, such as atactic polypropylene and atactic poly-1-butene; a copolymer of propylene (at a content of 50 mol % or more) and another α-olefin (ethylene, 1-butene, 1-pentene, 1-hexene, 4-methyl-1-pentene, 1-octene, 1-decene, or the like); and a copolymer of 1-butene (at a content of 50 mol % or more) and another α-olefin (ethylene, propylene, 1-pentene, 1-hexene, 4-methyl-1-pentene, 1-octene, 1-decene, or the like). Of those, atactic polypropylene (propylene content: 50 mol % or more), a copolymer of propylene (at a content of 50 mol % or more) and ethylene, and a copolymer of propylene and 1-butene are particularly preferred. Those resins may be used alone or in combination thereof.

1.7. Other Additives

The thermoplastic elastomer composition according to this embodiment may be used, as required, by being blended with various additives, for example, a softening agent other than the mineral oil-based softening agent, a lubricant, a stabilizer, such as an anti-aging agent, a heat stabilizer, a weathering agent, a metal deactivator, a UV absorber, a light stabilizer, or a copper inhibitor, a bactericide/fungicide, a dispersant, a plasticizer, a crystal nucleating agent, a flame retardant, a silicone oil, a silicone polymer, a tackifier, a foaming aid, a colorant, such as titanium oxide or carbon black, metal powder such as ferrite, an inorganic fiber, such as a glass fiber or a metal fiber, an organic fiber, such as a carbon fiber or an aramid fiber, a composite fiber, an inorganic whisker such as a potassium titanate whisker, a filler, such as glass beads, glass balloons, glass flakes, asbestos, mica, calcium carbonate, talc, silica, calcium silicate, hydrotalcite, kaolin, diatomaceous earth, graphite, pumice stone, ebonite powder, cotton flocks, cork powder, barium sulfate, a fluorine resin, or polymer beads, or a mixture thereof, a filler, such as polyolefin wax, cellulose powder, rubber powder, or wood powder, or a low-molecular-weight polymer.

<Softening Agent Other than Mineral Oil-Based Softening Agent>

Any commonly used softening agent for a rubber is used as the softening agent other than the mineral oil-based softening agent without particular limitations, but examples thereof include plant oils (palm oil and the like), esters of fatty acids and higher alcohols (phthalic acid diesters and the like), phosphoric acid triesters, and low-molecular-weight hydrocarbons, such as a polybutene-based one and a polybutadiene-based one.

1.8. Physical Property Measurement

1.8.1. Exothermic Peak Temperature

The exothermic peak temperature of the thermoplastic elastomer composition according to this embodiment is preferably 70° C. or more, more preferably 72° C. or more, still more preferably 73° C. or more, even still more preferably 74° C. or more, particularly preferably 75° C. or more. The exothermic peak temperature of the thermoplastic elastomer composition according to this embodiment is preferably 85° C. or less, more preferably 84° C. or less, still more preferably 83° C. or less, even still more preferably 82° C. or less, particularly preferably 81° C. or less. When the exothermic peak temperature of the thermoplastic elastomer composition according to this embodiment falls within the above-mentioned ranges, the thermoplastic elastomer composition shows fluidity even in a relatively low temperature region with respect to a general molding temperature, and can be subjected to molding processing without causing a significant defect in molding appearance.

With regard to the exothermic peak temperature of the thermoplastic elastomer composition, the exothermic peak temperature was defined as a temperature at which its exothermic energy amount became maximum in differential scanning calorimetry performed by decreasing a temperature from 200° C. to −80° C. at −10° C./min using a differential scanning calorimeter (DSC manufactured by NETZSCH, product name: "204 F1 Phoenix") in conformity with ISO 11357-3:2018.

1.8.2. Shear Viscosity

The shear viscosity of the thermoplastic elastomer composition according to this embodiment is 5 Pa·s or more, preferably 6 Pa s or more, more preferably 7 Pa·s or more. The shear viscosity of the thermoplastic elastomer composition according to this embodiment is 20 Pa s or less, preferably 18 Pa·s or less, more preferably 17 Pa·s or less. When the shear viscosity of the thermoplastic elastomer composition according to this embodiment falls within the above-mentioned ranges, the thermoplastic elastomer composition shows fluidity even in a relatively low temperature region with respect to a general molding temperature, and can be subjected to molding processing without causing a significant defect in molding appearance.

For the shear viscosity of the thermoplastic elastomer composition, its viscosity at 10,000 s$^{-1}$ was calculated from a plot of viscosity against shear rate obtained by continuously changing a shear rate from 10 s$^{-1}$ to 100,000 s$^{-1}$ at 140° C. using a capillary rheometer (manufactured by Rosand, product name: "RH10").

1.9. Molded Body and Applications

The thermoplastic elastomer composition according to this embodiment may be turned into a molded body using any of various molding methods, for example, injection molding methods, such as a gas injection molding method, an injection compression molding method, and a short-shot foaming method, an extrusion molding method, a blow molding method, and a compression molding method. Of those, an injection molding method is suitable. For example, when injection molding is performed, a molding temperature is generally from 130° C. to 280° C., preferably from 150° C. to 250° C. In addition, an injection pressure is generally from 5 MPa to 100 MPa, preferably from 10 MPa to 80 MPa. Meanwhile, a mold temperature is generally from 0° C. to 80° C., preferably from 20° C. to 60° C. After any such molding has been performed, the resultant molded body may be further subjected to a secondary process, such as laminate molding or thermoforming.

The thermoplastic elastomer composition according to this embodiment is suitable as a member for an automobile or a member for a building material, particularly a weather strip member for an automobile. In addition, the thermoplastic elastomer composition according to this embodiment may be used in a wide range of fields, such as automobile parts (an airbag storage cover, a center panel, a center console box, a door trim, a pillar, an assist grip, a steering wheel, a weather strip, a ceiling material, an interior sheet, a bumper molding, a side molding, an air spoiler, an air duct hose, a cup holder, a side brake grip, a shift knob cover, a flapper door seal, a wire harness grommet, a rack and pinion boot, a suspension cover boot, a glass guide, an inner belt line seal, a roof guide, a trunk lid seal, a molded quarter wind gasket, a corner molding, a glass encapsulation, a hood seal, a glass run channel, a secondary seal, a body panel, a side shield, a door skin, a hose, a wire harness cover, a seat adjuster cover, various packings, and the like), civil engineering/construction parts (civil engineering materials and construction materials, such as a ground improvement sheet, a water barrier sheet, and a noise and vibration prevention wall, various civil engineering/construction gaskets and sheets, a water barrier material, a joint material, a window frame, a window frame packing, and the like), sanitary goods (a women's sanitary item, a disposable diaper, a grip for a toothbrush, and the like), sports goods (a grip for a golf club or a tennis racket, and the like), industrial parts (a medical container, a gasket, a packing, and the like), food parts (a container, a packing, and the like), medical instrument parts, electric wires, miscellaneous goods, and toys.

2. METHOD OF PRODUCING THERMOPLASTIC ELASTOMER COMPOSITION

The thermoplastic elastomer composition according to this embodiment is obtained by melt-kneading the ethylene/α-olefin/non-conjugated polyene copolymer rubber (A), the polyolefin resin (B), and the mineral oil-based softening agent (C) in the presence of the organic peroxide (D) and the crosslinking aid (E). The "melt-kneading" in the invention refers to performing both of the application of a shear force and heating. When the component (A) and the component (B) are melt-kneaded in the presence of the organic peroxide (D) and the crosslinking aid (E), the thermoplastic elastomer composition having the sea-island structure in which the component (A) is dispersed as the dispersed phase (island phase) in the continuous phase (sea phase) of the component (B) is obtained.

As an apparatus capable of performing the melt-kneading, there may be given, for example, apparatus, such as an open-type mixing roll, a closed-type Banbury mixer, a kneader, a single-screw extruder, a co-rotating continuous twin-screw extruder, and a counter-rotating continuous twin-screw kneading machine. In addition, the treatment performed with such kneading apparatus may be performed in any one of a batch system or a continuous system.

The melt-kneading is preferably performed under a temperature condition within the range of from 150° C. to 250° C. from the viewpoint of a balance between the melting of the component (A) and the component (B), and the cross-linking reaction. The treatment time of the melt-kneading is not particularly limited, but is generally from 0.1 minute to 30 minutes when productivity and the like are taken into consideration.

3. EXAMPLES

The invention is further specifically described below by way of Examples. However, the invention is by no means limited to these Examples. The term "%" or "part(s)" in Examples and Comparative Examples is by mass unless otherwise indicated.

3.1. Materials Used (1) Ethylene/α-Olefin/Non-Conjugated Polyene Copolymer Rubbers Oil-extended ethylene/α-olefin/non-conjugated polyene copolymer rubbers OSR-1 and OSR-2 containing a mineral oil-based softening agent (product name: "Diana Process Oil PW380" manufactured by Idemitsu Kosan Co., Ltd.) at ratios shown in Table 1 below with respect to ethylene/α-olefin/non-conjugated polyene copolymer rubbers shown in Table 1 below were used.

TABLE 1

|  |  | Oil-extended ethylene/α-olefin/ non-conjugated polyene copolymer rubber | |
|---|---|---|---|
|  |  | OSR-1 | OSR-2 |
| Ethylene/α-olefin/ non-conjugated polyene copolymer rubber | Ethylene (parts by mass) | 69 | 69 |
|  | Propylene (parts by mass) | 26.5 | 26.5 |
|  | 5-Ethylidene-2-norbornene (parts by mass) | 4.5 | 4.5 |
| Mineral oil-based softening agent [phr] | | 100 | 40 |
| Limiting viscosity [η] | | 4.7 | 2.4 |
| Mw/Mn | | 3.7 | 2.3 |

The limiting viscosity in Table 1 above is a value for the limiting viscosity of the ethylene/α-olefin/non-conjugated polyene copolymer rubber measured in a decalin solvent at a temperature of 135° C. The Mw/Mn in Table 1 above was determined from values in terms of polystyrene measured by gel permeation chromatography (GPC).

(2) Polyolefin Resin (B)-1: a polypropylene/ethylene random copolymer. Manufactured by Japan Polypropylene Corporation, product name: "WINTEC WMX03". When its exothermic energy amount in temperature decrease DSC measurement in conformity with ISO 11357-3:2018 is defined as 100%, a temperature at which the exothermic energy amount reaches 95% by being integrated from a high-temperature side is 84° C.

(B)-2: a polypropylene/ethylene/1-butene random copolymer. Manufactured by Japan Polypropylene Corporation, product name: "NOVATEC FX4E". When its exothermic energy amount in temperature decrease DSC measurement in conformity with ISO 11357-3:2018 is defined as 100%, a temperature at which the exothermic energy amount reaches 95% by being integrated from a high-temperature side is 94° C.

(B)-3: a polypropylene/ethylene random copolymer. Manufactured by Japan Polypropylene Corporation, product name: "NOVATEC FL02A". When its exothermic energy amount in temperature decrease DSC measurement in conformity with ISO 11357-3:2018 is defined as 100%, a temperature at which the exothermic energy amount reaches 95% by being integrated from a high-temperature side is 95° C.

(B)-4: a polypropylene polymer. Manufactured by Japan Polypropylene Corporation, product name: "NOVATEC MA3". When its exothermic energy amount in temperature decrease DSC measurement in conformity with ISO 11357-3:2018 is defined as 100%, a temperature at which the exothermic energy amount reaches 95% by being integrated from a high-temperature side is 108° C.

(3) Mineral Oil-Based Softening Agent (C): manufactured by Idemitsu Kosan Co., Ltd., product name: "Diana Process Oil PW380"

(4) Organic Peroxide (Crosslinking Agent)

(D): 2,5-dimethyl-2,5-di(tert-butylperoxy)hexane, manufactured by NOF Corporation, product name: "Perhexa 25B-40"

(5) Crosslinking Aid (E)-1: bis(3-ethyl-5-methyl-4-maleimidophenyl)methane, manufactured by Ouchi Shinko Chemical Industrial Co., Ltd., product name: "BMI-5100"

(E)-2: divinylbenzene, manufactured by Sankyokasei Co., Ltd., product name: "Divinylbenzene (purity: 55 wt %)"

(6) Amorphous Polyolefin Resin (F): a propylene/1-butene amorphous copolymer, manufactured by Evonik, product name: "VESTPLAST 508". The endothermic energy amount of its peak observed by a method to be described later is 1.9 $J \cdot g^{-1}$.

(7) Anti-Aging Agent

Pentaerythritol tetrakis(3-(3,5-di-tert-butyl-4-hydroxyphenyl)propionate), manufactured by BASF Japan Ltd., product name: "Irganox 1010"

3.2. Example 1

3.2.1. Production of Thermoplastic Elastomer Composition

67 Parts by mass of the oil-extended ethylene/α-olefin/non-conjugated polyene copolymer rubber OSR-1, 23 parts by mass of the polyolefin resin (B)-1, 10 parts by mass of the mineral oil-based softening agent (C) added portion, 0.8 part by mass of the crosslinking aid (E)-1, and 0.1 part by mass of the anti-aging agent were loaded into a 10-liter double-arm type pressure kneader (manufactured by Nihon Spindle Manufacturing Co., Ltd.) that had been heated to 150° C., and were kneaded at 40 rpm for 20 minutes. After that, the composition in a molten state was pelletized with Feeder Ruder (manufactured by Nihon Spindle Manufacturing Co., Ltd.) set to 180° C. and 40 rpm. The resultant pelletized product was blended with 1.2 parts by mass of the organic peroxide (D), and mixed therewith in a Henschel mixer for 30 seconds, and the mixture was extruded while being subjected to melt-kneading treatment under the conditions of staying for 2 minutes at 230° C. and 500 rpm through use of a twin-screw extruder (manufactured by Kobe Steel, Ltd., model: "HYPERKTX 30", co-rotating and fully intermeshing screws, having a ratio L/D between screw flight length L and screw diameter D of 74) to provide a pellet-shaped thermoplastic elastomer composition.

3.2.2. Evaluation Methods Shear viscosity measurement and DSC measurement of the obtained pellet-shaped thermoplastic elastomer composition, and DSC measurement of the component (B) and the component (F) were performed by the following methods, and each item was evaluated.

(1) Shear Viscosity Measurement

A viscosity at 10,000 $s^{-1}$ was calculated from a plot of viscosity against shear rate obtained by continuously changing a shear rate from 10 $s^{-1}$ to 100,000 $s^{-1}$ at 140° C. using a capillary rheometer (manufactured by Rosand, product name: "RH10"). In this case, the shear rate and shear viscosity to be plotted were subjected to Rabinowicz correction and Bagley correction before use.

(2) DSC Measurement

DSC measurement was performed using a differential scanning calorimeter (DSC manufactured by NETZSCH, product name: "204 F1 Phoenix") in conformity with ISO 11357-3:2018.

Exothermic peak temperature in temperature decrease DSC measurement of thermoplastic elastomer composition: defined as a temperature at which an exothermic peak recognized when the composition melted by heating at 200° C. was cooled at a rate of 10° C./min to −80° C. topped out.

Endothermic energy amount in temperature increase measurement of thermoplastic elastomer composition: The endothermic energy amount was defined as the area of an endothermic peak recognized when, after the temperature decrease measurement of the thermoplastic elastomer composition, the composition cooled to −80° C. was further heated at a rate of 10° C./min to 200° C.

Temperature at which exothermic energy amount in temperature decrease DSC measurement of component (B) defined as 100% reaches 95% by being integrated from high-temperature side: The area of an exothermic peak recognized when the component (B) melted by heating at 200° C. was cooled at a rate of 10° C./min to −80° C. was defined as an exothermic energy amount of 100%. A temperature at which the exothermic energy amount reached 95% by being integrated from a high-temperature side was taken.

Endothermic energy amount in temperature increase DSC of component (F): The endothermic energy amount was defined as the area of an endothermic peak recognized by the same method as that for the endothermic energy amount in the temperature increase measurement of the thermoplastic elastomer composition.

Then, the obtained pellet-shaped thermoplastic elastomer composition was injection-molded into a flat plate measuring 120 mm×120 mm×2 mm (length×width×thickness) using an injection molding machine having a clamping force of 110 tons (manufactured by The Japan Steel Works, Ltd., product name: "J-110AD"). Thus, a test piece was obtained. The resultant test piece was evaluated for its hardness, compression set, tensile strength, maximum elongation, and molding appearance.

(3) Hardness (Duro-A)

Measurement was performed in conformity with JIS K6253-3:2012 (Duro-A).

(4) Compression Set

An indicator of elastic recoverability, a compression set at the time of 25% compression at 70° C. for 22 hours was measured in conformity with JIS K6262:2013. As the value of the compression set becomes lower, the elastic recoverability may be judged to be better.

(5) Tensile Test

The tensile strength ($T_B$) and the maximum elongation ($E_B$) were measured in conformity with JIS K6251:2017.

(6) Molding Appearance

The test piece obtained above was evaluated for a sink mark, burning, and mold transferability on the following two-point scale.

(Evaluation Criteria)

A: The molding appearance is excellent without any of a sink mark, burning, and skin layer delamination.

B: The molding appearance is poor with the occurrence of the phenomenon of any one of a sink mark, burning, and skin layer delamination.

3.3. Examples 2 to 4 and Comparative Examples 1 to 5

Pellet-shaped thermoplastic elastomer compositions and test pieces were produced in the same manner as in Example 1 at ratios shown in Table 2 below, and were evaluated in the same manner as in Example 1.

3.4. Evaluation Results

Table 2 below illustrates the compositions of the thermoplastic elastomer compositions of Examples and Comparative Examples, and the evaluation results.

objectives and effects) as the configurations described in the embodiments. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Although the embodiments of the invention have been described in detail above, those skilled in the art would readily appreciate that many modifications can be made from the embodiments without materially departing from the novel teachings and effects of the invention. Accordingly, all such modifications are assumed to be included in the scope of the invention.

TABLE 2

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Oil-extended ethylene/α-olefin/non-conjugated polyene copolymer rubber | OSR-1 | 67 | 80 | 60 | 71 | | 78 | 60 | 68 | 70 |
| | OSR-2 | | | | | 67 | | | | |
| Polyolefin resin | (B)-1 | 23 | 9 | 31 | | 23 | | | | |
| | (B)-2 | | | | 12 | | | | | |
| | (B)-3 | | | | | | 17 | 17 | 29 | |
| | (B)-4 | | | | | | | | | 22 |
| Amorphous polyolefin resin (F) | | | 4 | | | | 2 | 2 | 3 | 2 |
| Mineral oil-based softening agent (C) added portion | | 10 | 7 | 9 | 17 | 10 | 3 | 21 | | 6 |
| Organic peroxide (D) | | 1.2 | 1.2 | 1.2 | 1.2 | 1.2 | 1.2 | 1.2 | 1.2 | 1.2 |
| Crosslinking aid | (E)-1 | 0.8 | 0.8 | 0.8 | | 0.8 | 0.8 | 0.8 | 0.8 | 0.8 |
| | (E)-2 | | | | 0.8 | | | | | |
| Anti-aging agent | | 0.1 | 0.1 | 0.1 | 0.1 | 0.1 | 0.1 | 0.1 | 0.1 | 0.1 |
| Ethylene/α-olefin/non-conjugated polyene copolymer rubber (A) | | 33.5 | 40 | 30 | 35.5 | 47.9 | 39 | 30 | 34 | 35 |
| Mineral oil-based softening agent (C) (total) | | 43.5 | 47 | 39 | 52.5 | 29.1 | 42 | 51 | 34 | 41 |
| Mass ratio (C)/(A) between component (A) and component (C) | | 1.3 | 1.2 | 1.3 | 1.5 | 0.4 | 1.1 | 1.7 | 1.0 | 1.2 |
| Evaluation results (pellet) | Shear viscosity [Pa·s] | 11.0 | 7.7 | 10.5 | 15.0 | 36.2 | 40.0 | 4.1 | 25.0 | Did not flow |
| | Exothermic peak temperature in temperature decrease DSC measurement [° C.] | 76.0 | 76.6 | 76.8 | 76.8 | 77.1 | 85.0 | 83.1 | 89.7 | 101.7 |
| | Endothermic energy amount in temperature increase DSC measurement [J·g$^{-1}$] | 16.0 | 5.3 | 23.1 | 9.5 | 17.5 | 14.1 | 12.0 | 24.3 | 26.6 |
| Evaluation results (injection-molded article) | Hardness (Duro-A) | 67 | 40 | 78 | 45 | 78 | 65 | 51 | 78 | 80 |
| | Compression set [%] | 56 | 40 | 57 | 35 | 51 | 50 | 46 | 58 | 56 |
| | Tensile strength $T_B$ [MPa] | 8.1 | 3.2 | 9.0 | 3.5 | 9.0 | 6.3 | 5.0 | 7.7 | 6.6 |
| | Maximum elongation $E_B$ [%] | 790 | 570 | 680 | 550 | 920 | 610 | 490 | 680 | 610 |
| | Molding appearance | A | A | A | A | A | A | B | A | A |

It was found from the evaluation results of Table 2 above that the thermoplastic elastomer compositions of Examples 1 to 4 had low shear viscosities, thereby being excellent in fluidity, and also provided satisfactory appearances of molded articles, as compared to the thermoplastic elastomer compositions of Comparative Examples 1 to 5.

The invention is not limited to the embodiments described above, and various modifications may be made thereto. The invention includes configurations that are substantially the same (for example, in functions, methods, and results, or in

What is claimed is:

1. A thermoplastic elastomer composition obtained by melt-kneading an ethylene/α-olefin/non-conjugated polyene copolymer rubber (A) that is a copolymer of ethylene, an α-olefin having 3 to 20 carbon atoms, and a non-conjugated polyene, a polyolefin resin (B), and a mineral oil-based softening agent (C) in the presence of an organic peroxide (D) and a crosslinking aid (E), wherein, when a total exothermic energy amount of a peak observed when the polyolefin resin (B) is subjected to differential scanning calorimetry by decreasing a temperature from 200° C. to −80° C. at −10° C./min in conformity with ISO 11357-3:2018 is defined as 100%, a temperature at which the observed peak reaches 95% by being integrated from a high-temperature side is from 75° C. to 95° C., wherein a mass ratio (C)/(A) between the mineral oil-based softening agent (C) and the ethylene/α-olefin/non-conjugated polyene copolymer rubber (A) falls within a range of from 0.8 to 1.9, the thermoplastic elastomer composition having a shear viscosity of from 5 Pas to 20 Pa·s at 140° C. and 10,000 $s^{-1}$.

2. The thermoplastic elastomer composition according to claim 1, wherein, when the thermoplastic elastomer composition is subjected to differential scanning calorimetry by decreasing a temperature from 200° C. to −80° C. at −10° C./min in conformity with ISO 11357-3:2018, an exothermic peak is observed at from 70° C. to 85° C.

3. The thermoplastic elastomer composition according to claim 1, wherein the thermoplastic elastomer composition has an endothermic energy amount of from 1 $J·g^{-1}$ to 25 $J·g^{-1}$ for a peak observed when differential scanning calorimetry is performed by increasing a temperature from −80° C. to 200° C. at 10° C./min in conformity with ISO 11357-3:2018.

4. The thermoplastic elastomer composition according to claim 1, further comprising an amorphous polyolefin resin (F) having an endothermic energy amount of 10.5 $J·g^{-1}$ or less for a peak observed when differential scanning calorimetry is performed by increasing a temperature from −80° C. to 200° C. at 10° C./min in conformity with ISO 11357-3:2018.

5. An automobile weather strip, in at least part of which the thermoplastic elastomer composition of claim 1 is used.

* * * * *